US012574138B2

(12) United States Patent
Kaeval et al.

(10) Patent No.: US 12,574,138 B2
(45) Date of Patent: Mar. 10, 2026

(54) METHOD AND APPARATUS FOR PROVIDING END-TO-END OPTICAL SPECTRUM SERVICES OVER MULTIPLE TRANSPARENT OPTICAL NETWORK DOMAINS

(71) Applicant: ADVA Optical Networking SE, Meiningen OT Dreissigacker (DE)

(72) Inventors: Kaida Kaeval, Tallinn (EE); Klaus Grobe, Planegg (DE); Jörg-Peter Elbers, Fuerstenfeldbruck (DE)

(73) Assignee: ADTRAN NETWORKS SE, Meiningen OT Dreissigacker (DE)

( * ) Notice: Subject to any disclaimer, the term of this patent is extended or adjusted under 35 U.S.C. 154(b) by 559 days.

(21) Appl. No.: 18/075,405

(22) Filed: Dec. 5, 2022

(65) Prior Publication Data

US 2023/0318731 A1     Oct. 5, 2023

(30) Foreign Application Priority Data

Mar. 31, 2022     (EP) ................................... 22166038

(51) Int. Cl.
*H04J 14/02*          (2006.01)
*H04B 10/07*          (2013.01)
          (Continued)

(52) U.S. Cl.
CPC ...... *H04J 14/0278* (2013.01); *H04J 14/0245* (2013.01); *H04B 10/07* (2013.01);
          (Continued)

(58) Field of Classification Search
CPC .... H04J 14/0278; H04J 14/0245; H04J 14/00; H04B 10/27; H04B 10/0795;
          (Continued)

(56) References Cited

U.S. PATENT DOCUMENTS 6,515,777 B1 *   2/2003   Arnold ................ H04J 14/0283
                                                          359/337
7,437,449 B1 *  10/2008   Monga ................... H04L 41/00
                                                          709/224
          (Continued)

OTHER PUBLICATIONS

Adva on Se Munich: "ADVA FSP 3000 TeraFlexbreaks multiple industry records in live network trial", Jul. 24, 2018 (Jul. 24, 2019), pp. 1-5, XP093186343.

(Continued)

*Primary Examiner* — Dibson J Sanchez
(74) *Attorney, Agent, or Firm* — Jenkins, Taylor & Hunt, P.A.

(57)          ABSTRACT

A transparent optical overlay network (1) for providing end-to-end optical spectrum services over multiple transparent optical network domains (2) is described. The transparent optical overlay network (1) includes network domain interface devices, NDIDs, (3) provided at domain boundaries between adjacent transparent optical network domains (2). The network domain interface device, NDID (3), monitors and adjusts incoming optical signals received by the NDID (3) from a first transparent optical network domain (2-1) and monitors and adjusts outgoing optical signals output by the NDID (3) to an adjacent second transparent optical network domain (2-2). An overlay network controller (5) manages and controls the end-to-end optical spectrum services by controlling the NDIDs (3). The overlay network controller collects telemetry data (TDATA) for optical spectrum service characterization and SLA policing of the optical spectrum services.

16 Claims, 8 Drawing Sheets

(51) Int. Cl.

| | |
|---|---|
| *H04B 10/077* | (2013.01) |
| *H04B 10/079* | (2013.01) |
| *H04J 14/00* | (2006.01) |
| *H04Q 11/00* | (2006.01) |

(52) U.S. Cl.
CPC ...... *H04B 10/0773* (2013.01); *H04B 10/0793* (2013.01); *H04J 14/00* (2013.01); *H04Q 11/00* (2013.01); *H04Q 11/0062* (2013.01)

(58) Field of Classification Search
CPC ........................... H04B 10/07; H04B 10/0773; H04B 10/0793; H04Q 11/00; H04Q 11/0062
USPC .......................................... 398/9–38, 43–103
See application file for complete search history.

(56) References Cited

U.S. PATENT DOCUMENTS

| | | | | |
|---|---|---|---|---|
| 9,172,658 | B2 * | 10/2015 | Kakkar ................. | H04L 47/728 |
| 9,954,611 | B1 * | 4/2018 | Lee .......................... | H04L 45/62 |
| 11,251,897 | B2 | 2/2022 | Yilmaz et al. | |
| 11,277,330 | B1 * | 3/2022 | Davis ...................... | H04L 45/04 |
| 2002/0186459 | A1 * | 12/2002 | DeGrange, Jr. ... | H04J 14/02212 |
| | | | | 359/341.4 |
| 2004/0156094 | A1 * | 8/2004 | Kawahara ............ | H04B 10/296 |
| | | | | 359/333 |
| 2008/0031619 | A1 * | 2/2008 | Xu .......................... | H04L 45/28 |
| | | | | 398/2 |
| 2008/0225723 | A1 * | 9/2008 | Lee ......................... | H04L 45/50 |
| | | | | 370/235 |
| 2009/0161681 | A1 * | 6/2009 | Madrahalli ........ | H04Q 11/0062 |
| | | | | 370/401 |
| 2010/0226647 | A1 * | 9/2010 | Sun ..................... | H04Q 11/0062 |
| | | | | 398/45 |
| 2012/0224845 | A1 * | 9/2012 | Swinkels ............ | H04J 14/0268 |
| | | | | 398/58 |
| 2012/0308225 | A1 * | 12/2012 | Long ...................... | H04L 45/04 |
| | | | | 398/13 |
| 2013/0163983 | A1 * | 6/2013 | Skoog ................... | H04L 47/724 |
| | | | | 398/5 |
| 2014/0169783 | A1 * | 6/2014 | Surek ................. | H04Q 11/0062 |
| | | | | 398/10 |
| 2018/0062782 | A1 * | 3/2018 | Mehrvar .......... | H04B 10/25891 |
| 2019/0109638 | A1 * | 4/2019 | Yilmaz ............... | H04L 41/0816 |
| 2019/0115977 | A1 * | 4/2019 | Yuki ................. | H04J 14/02216 |
| 2019/0229830 | A1 * | 7/2019 | Bruno ................. | H04L 41/0806 |
| 2019/0363789 | A1 * | 11/2019 | Lee ..................... | H04B 10/0791 |
| 2025/0007639 | A1 * | 1/2025 | Haag ................... | H04L 41/5019 |

OTHER PUBLICATIONS

Ekinops Sa: "EKINOPS RM ROADM-H4-WB Four-Degree Open Architecture ROADM Shelf", Dec. 1, 2021 (Dec. 1, 2021), pp. 1-2, XP093186347.
Communication Pursuant to Article 94(3) EPC for European Patent Application Serial No. 22166038.4 (Aug. 8, 2024).
Communication of the extended European search report for European Patent Application No. 22166038.4 (Oct. 7, 2022).
Kaeval et al., "QoT assessment of the optical spectrum as a service in disaggregated network scenarios," in Journal of Optical Communications and Networking, vol. 13, No. 10, pp. 1-10 (Oct. 2021).
Escalona et al., "Using SDN for Cloud Services Provisioning: The XIFI Use-Case," 2013 IEEE SDN for Future Networks and Services, pp. 1-7 (2013).
Office Action for European Patent Application Serial No. 22166038.4 (Jul. 16, 2025).

* cited by examiner

Domain 1

- Network domain
- Spectrum
- Sub-spectrum
- Customer wavelength
- Sensory interfaces
- ASE noise
- Channel probe
- Etc.

NDID

Connect w/o the
need for 3R
Re-amplification,
Re-shaping,
Re-timing shown for one direction only

Domain 2

- Network domain
- Spectrum
- Sub-spectrum
- Customer wavelength
- Etc.

METHOD AND APPARATUS FOR PROVIDING END-TO-END OPTICAL SPECTRUM SERVICES OVER MULTIPLE TRANSPARENT OPTICAL NETWORK DOMAINS

PRIORITY CLAIM

This application claims the priority benefit of European Patent Application Number 22166038.4, filed Mar. 31, 2022, the disclosure of which is incorporated herein by reference in its entirety.

TECHNICAL FIELD

The invention relates to a method and apparatus for providing end-to-end optical spectrum services over multiple transparent optical network domains making use of a common overlay network controller.

TECHNICAL BACKGROUND

Optical backbone networks are normally built in a transparent manner, utilizing fibre amplifiers along the route, where add/drop traffic is not required. Although in principle, a light signal could travel from A to B between any location in these transparent networks, if the same frequency would be available, these transparent Optical networks are normally segmented into transparent optical network domains. The transparent optical network domains can be management-specific, vendor-specific, regional- and/or operator-specific domains.

Conventional interfaces at the domain boundaries between two adjacent optical network domains commonly use optical-electrical-optical (O/E/O) conversion and digital signal regeneration to provide a reliable interworking and domain separation. However, these conventional interfaces add additional complexity to the optical network and consume additional energy and space. Furthermore, conventional interfaces between the domain boundaries limit network flexibility and future upgradability as they operate at specific data rates and use specific signal formats. In conventional networks, most transitions between adjacent transparent optical network domains are realized via such O/E/O conversion points. In conventional optical networks, transparent interconnections are only rarely used as network operators lack reliable means for a power control and signal adjustment. In the rare cases in which multi-domain transparent services are offered, they comprise manually switched circuits based on friendly operator agreements and are only available for narrowband wavelength signals but not for wideband spectrum services with unknown tributary signal constitution.

While some form of transparent interconnection between the domains can be realized by using overlay SDN controllers, the realization of this is highly dependent on the control and monitoring capabilities of the existing equipment, especially reconfigurable optical add-drop multiplexers (ROADMs). Furthermore, all optical network domain operators must agree to SDN overlay controller to monitor, control and modify the configurations of their equipment. This is often not the case, specifically among optical network domain operators operating mission-critical or business-critical communication channels. While ROADMs provide limited power control capabilities, they form an integral part of a particular network domain. Therefore, they cannot be used as independent network elements to control and adjust external services entering into the domain with any other channel equalization time interval, gradual enabling and disabling of the signal, telemetry data collection and signal performance comparison with agreed SLA-s or other. Moreover, if these essential functions for reliable domain transition are not present in already existing ROADMs, these functions often cannot be added with a software upgrade and hardware upgrade is required. Regardless, even if upgraded, the ROADMs are still monitored and controlled by the service provider/optical domain operator, and it is complicated to share the monitoring access with the service user or arrange the interoperability with other ROADMs from other domains, specifically, when the next domain owner is not willing to let their ROADMs to be controlled by an external party or SDN controller. Due to these problems faced by the SDN based solutions for transparent domain interconnect, alternative solutions for transparent domain interconnect are required.

Automatically provisioned optical overlay services over multiple optical network domains have so far only been considered as OTN services on layer 1. Optical virtual private networks (O-VPNs) have so far only been proposed on layer 1 or have been limited to a single network domain.

Accordingly, there is a need to provide reliable operation of end-to-end optical spectrum services over multi-domain transparent optical networks while eliminating conventional optical-electrical-optical (O/E/O) conversion points. Optical spectrum service is defined as an open light path in the transparent optical domain, that is capable of carrying a single or multiple optical carriers, depending on its configured width. According to ITU-T G.694.1, optical spectrum slot can be defined by its central frequency and slot width, and any combination of spectrum slots is allowed as long as no two spectrum slots overlap. Common configurations can include narrow-band 37.5 GHz and 50.0 GHz optical spectrum services or wide-band optical spectrum services, accommodating a single or more high symbol rate signals, starting with optical spectrum slot width 62.5 GHz and beyond.

SUMMARY

The invention provides according to a first aspect a transparent optical overlay network for providing end-to-end optical spectrum services over multiple transparent optical network domains, said transparent optical overlay network comprising network domain interface devices provided at domain boundaries between adjacent transparent optical network domains, wherein the network domain interface device is adapted to monitor and adjust incoming optical signals received by the network domain interface device from a first transparent optical network domain and to monitor and adjust outgoing optical signals output by the network domain interface device to an adjacent second transparent optical network domain, and comprising an overlay network controller adapted to manage and control the end-to-end optical spectrum services by controlling the network domain interface devices and adapted to collect telemetry data for optical spectrum service characterization of the optical spectrum services.

The invention provides a transparent optical overlay network over federated transparent optical network resources as underlay. The transparent optical overlay network can operate over transparent greenfield and brownfield network domains.

An advantage of the transparent optical overlay network according to the first aspect of the present invention is that the network domain interface devices can create independence of hardware or software used in the different transparent optical network domains.

The network domain interface devices can mediate between optical power and spectrum requirements of adjacent optical network domains. A transparent optical overlay network allows to eliminate intermediate O/E/O conversion points. This in turn lowers the required electrical power, space and complexity to implement end-to end transparent optical spectrum services in any underlying transparent optical network domain. Furthermore, the elimination of the intermediate O/E/O conversion points increases the overall service availability and offers future-proof upgradability of the services.

In a possible embodiment of the transparent optical overlay network according to the first aspect of the present invention, the overlay network controller is adapted to process telemetry data to perform continuously a long-term performance monitoring of the end-to-end optical spectrum services and/or to perform a monitoring of a transparent optical network domain parameters and their conformance with underlying service level agreement parameters.

The telemetry data collected by the overlay network controller from the network domain interface devices can for instance comprise Q-values, bit error ratios or signal power level data.

In a further possible embodiment of the transparent optical overlay network according to the first aspect of the present invention, the network domain interface device can comprise signal monitoring means.

In a possible implementation of the transparent overlay network the signal monitoring means of a network domain interface device can comprise an input signal monitoring unit and an output signal monitoring unit.

The input signal monitoring unit is adapted in a possible embodiment to monitor incoming optical signals received by the network domain interface device from the first transparent optical network domain.

The output signal monitoring unit of the network domain interface device is adapted in a preferred embodiment to monitor outgoing optical signals transmitted by the network domain interface device to a second transparent optical network domain in an outgoing optical spectrum.

The monitoring data generated by the input signal monitoring unit and by the output signal monitoring unit can be stored in a local controller integrated in the network domain interface device and accessed independently, if relevant permissions are agreed between optical domain provider, service end-user and NDID provider/optical overlay network provider.

In a further possible embodiment of the transparent optical overlay network according to the first aspect of the present invention, the network domain interface device comprises signal adjustment means having at least one input signal adjustment unit and having at least one output signal adjustment unit.

The input signal adjustment unit is adapted in a possible embodiment to adjust incoming optical signals received by the network domain interface device from the first transparent optical network domain in an incoming optical signal spectrum in response to control signals received by the at least one input signal adjustment unit from a controller integrated in the network domain interface device or received from the overlay network controller.

Further, the at least one output signal adjustment unit of the network domain interface device is adapted in a possible embodiment to adjust outgoing optical signals transmitted by the network domain interface device to the second adjacent transparent optical network domain in an outgoing optical signal spectrum in response to control signals received by the at least one output signal adjustment unit from the controller integrated in the network domain interface device or received from the overlay network controller.

In a possible embodiment of the transparent optical overlay network according to the first aspect of the present invention, the input signal adjustment unit of the network domain interface device is adapted to shutdown, attenuate, amplify, filter, switch and/or to equalize the incoming optical signals received by the network domain interface device from the first transparent optical network domain in the incoming optical signal spectrum in response to control signals received by the input signal adjustment unit from the controller integrated in the network domain interface device or received from the overlay network controller.

In a further possible embodiment of the transparent optical overlay network according to the first aspect of the present invention, the output signal adjustment unit of the network domain interface device is adapted to gradually enable, amplify, equalize and/or to pre-emphasize the outgoing optical signals transmitted by the network domain interface device to the second transparent optical network domain in the outgoing optical signal spectrum in response to control signals received by the output signal adjustment unit from the controller integrated in the network domain interface device or received from the overlay network controller.

In a further possible embodiment of the transparent optical overlay network according to the first aspect of the present invention, the signal monitoring means of the network domain interface device are adapted to monitor the performance of the incoming optical signal spectrum and/or the outgoing optical signal spectrum of the adjacent optical network domains.

In a still further possible embodiment of the transparent optical overlay network according to the first aspect of the present invention, the output signal adjustment unit of the network domain interface device is further adapted to perform ASE noise insertion and/or dummy channel insertion in response to control signals received by the output signal adjustment unit from the controller integrated in the network domain interface device or received from the overlay network controller.

In a further possible embodiment of the transparent optical overlay network according to the first aspect of the present invention, the signal monitoring means of the network domain interface device are adapted to perform channel probing of optical channels in the incoming optical signal spectrum and/or in the outgoing optical signal spectrum of the adjacent optical network domains.

In a further possible embodiment of the transparent optical overlay network according to the first aspect of the present invention, the signal monitoring means of the network domain interface device are adapted to monitor a signal power, a signal power spectral density, an optical signal to noise ratio OSNR, and any parameter retrieved through channel probing, like generalized signal to noise ratio GSNR, Chromatic Dispersion, PMD, or other of incoming optical signals and/or of outgoing optical signals.

In a further possible embodiment of the transparent optical overlay network according to the first aspect of the present invention, the signal monitoring means of the network domain interface device include the ability to provide telemetry data for the transparent optical overlay network controller for incoming and outcoming spectrum characterization, long-term monitoring and Service Level Agreement, SLA, policing.

In a further possible embodiment of the transparent optical overlay network according to the first aspect of the present invention, the output signal adjustment unit comprises an EDFA array with optical signal amplifiers for signal amplification of optical signals in response to control signals received by the output signal adjustment unit from the controller integrated in the network domain interface device and comprises a variable optical attenuator, VOA, array.

In a further possible embodiment of the transparent optical overlay network according to the first aspect of the present invention, the input signal adjustment unit of the network domain interface device comprise at least one N:M wavelength selective switch, WSS, where and adapted to switch or route the incoming optical signals received by the network domain interface device from the first transparent optical network domain to the second transparent optical network domain in response to control signals received by the input signal adjustment unit from the controller integrated in the network domain interface device or received from the overlay network controller.

In a still further possible embodiment of the transparent optical overlay network according to the first aspect of the present invention, the network domain interface device comprises a control interface for connection to the overlay network controller of the transparent optical overlay network.

The invention provides according to a further aspect a network domain interface device for a transparent optical overlay network according to the first aspect of the present invention, wherein the network domain interface device is provided at a domain boundary between two adjacent transparent optical network domains and is adapted to monitor and to adjust incoming optical signals received by the network domain interface device from a first transparent optical network domain, and to monitor and to adjust outgoing optical signals output by the network interface device to an adjacent second transparent optical network domain, wherein the network domain interface device comprises an interface to the overlay network controller of the transparent optical overlay network provided to manage and control end-to-end optical spectrum services by controlling the network domain interface device.

The invention provides according to a further aspect an overlay network controller of a transparent optical overlay network providing end-to-end optical spectrum services over multiple transparent optical network domains, wherein said overlay network controller is adapted to manage and to control the end-to-end optical spectrum services by configuring network domain interface devices provided at domain boundaries between adjacent transparent optical network domains.

The invention provides according to a further aspect a method for providing end-to-end optical spectrum services over multiple transparent optical network domains, wherein network domain interface devices provided at domain boundaries between adjacent transparent optical network domains monitor and adjust incoming optical signals received by the network domain interface device from a first transparent optical network domain and monitor and adjust outgoing optical signals output by the network domain interface device to an adjacent second transparent optical network domain in response to control signals received by the network domain interface device from a common overlay network controller used to manage and control the end-to-end optical spectrum services and controlling the network domain interface devices and used to collect telemetry data for optical spectrum service characterization of the optical spectrum services.

In a further possible embodiment of the transparent optical overlay network according to the first aspect of the present invention, the transparent optical domains comprise associated domain controllers connected to the overlay network controller of the transparent optical overlay network to exchange information about a network domain topology, available resources and services in the transparent optical network domains available to the transparent optical overlay network for optical network domain operators who can flexibly share their network resources and allow their network devices to be monitored, controlled and configured by external controller.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
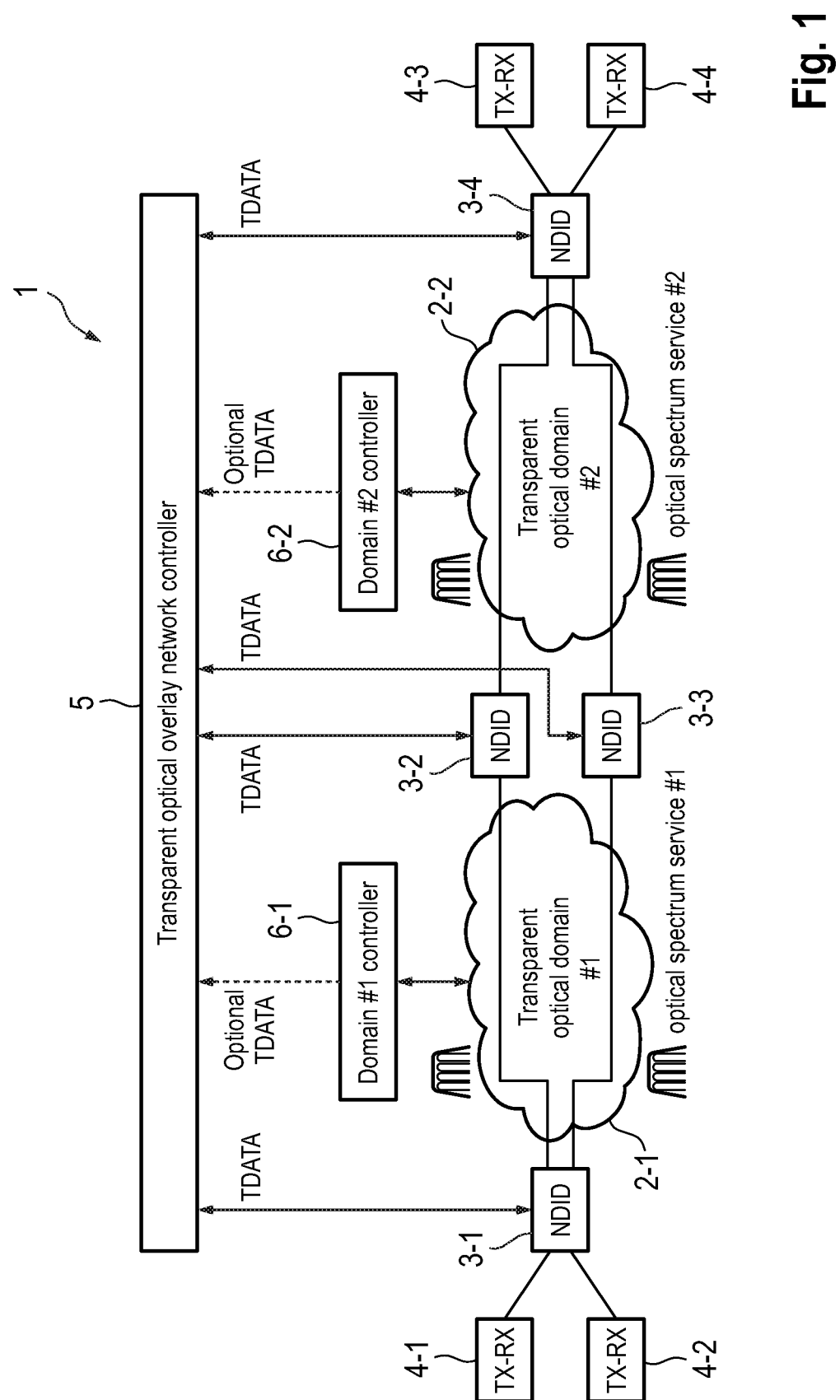
FIG. 1 shows a schematic diagram for illustrating a possible exemplary embodiment of a transparent optical overlay network according to the first aspect of the present invention.

As can be seen in the schematic diagram of FIG. 1, a transparent optical overlay network 1 according to a first aspect of the present invention can be used for providing end-to-end optical spectrum services over multiple transparent optical network domains. In the illustrated example of FIG. 1, the transparent optical overlay network 1 comprises two adjacent transparent optical network domains 2-1, 2-2. As can be seen in FIG. 1, network domain interface devices (NDID) 3-*i* are provided at domain boundaries between the adjacent transparent optical network domains 2-1, 2-2. The network domain interface devices 3-*i* can comprise network-domain-to-network-domain interface devices but also user to network domain interface devices. In the illustrated example of FIG. 1, transceivers 4-1, 4-2 are connected to the network domain interface device 3-1. Further, transceivers 4-3, 4-4 are connected to the network domain interface device 3-4. The network domain interface device 3-1 forms a network domain interface device between the transceivers 4-1, 4-2 and the first transparent optical network domain 2-1 of the transparent optical overlay network 1. Further, the network domain interface device 3-4 forms a network domain interface device between the second transparent optical network domain 2-2 and the transceivers 4-3, 4-4 as illustrated in FIG. 1. A transceiver 4-*i* as illustrated in FIG. 1 can stand for a single transceiver or for a set of transceivers, together with necessary add/drop filters or splitters and amplifiers. In the illustrated example of FIG. 1, the transparent optical overlay network 1 comprises two adjacent transparent optical network domains. In other embodiments, the number of transparent optical network domains can vary. Between adjacent transparent optical network domains, there can be provided one or more network-domain-to-network-domain interface devices 3-2, 3-3 as shown in FIG. 1.

In the illustrated example of FIG. 1, the transparent optical overlay network 1 comprises several network domain interface devices 3-1, 3-2, 3-3, 3-4 each being connected via an interface to a common overlay network controller 5 of the transparent optical overlay network 1. The overlay network controller 5 is adapted to manage and to control the end-to-end optical spectrum services by controlling the different network domain interface devices 3-*i*. In a preferred embodiment, the overlay network controller 5 is further adapted to collect telemetry data TDATA from the network domain interface devices 3-*i* via associated data interfaces as illustrated in FIG. 1. The telemetry data TDATA can comprise in a possible embodiment Q-values, bit error ratios BER as well as signal power level data. The overlay network controller can be adapted to process the received telemetry data TDATA collected from the network domain interface devices 3-*i* of the transparent optical overlay network 1 to perform in a possible embodiment continuously a long-term performance monitoring of one or more end-to-end optical spectrum services. The overlay network controller 5 can also process the collected telemetry data TDATA to monitor a conformance of service parameters of the end-to-end optical spectrum services with underlying service level agreement, SLA, parameters.

The telemetry data (TDATA) comprises an operational live data collection from the interconnected devices and spectral resources. The telemetry data (TDATA) can include, but are not limited to Rx Power values/profiles, PSD distribution, OSNR profile (if ASE-loading is used), Rx power values, Pre-FEC BER, Q-value, or any other parameter reported by the Probing Light Transceiver (if channel probing is used).

The system according to the present invention allows to monitor Service Level agreement (SLA) compliance during operation of the transparent optical overlay network 1. In case of a fault, it can be determined which party did not comply with SLA requirements. Telemetry data (TDATA) is collected continuously by the Network Domain Interface Devices 3 and can be processed to monitor the service compliance with the Service Level Agreement (SLA), as well as to detect any performance related patterns in the network (daily, yearly, temperature related, or other). These functions are carried out in a possible embodiment by the Overlay Network Controller 5 of the transparent optical overlay network 1. Based on the telemetry data (TDATA), the Overlay Network Controller 5 can control the compatibility of the interconnected spectrum resources from transparent optical domains 2, optical spectrum services and individual signals within the service to the contractual agreement between domain operator and end-customer. Any deviation from defined service parameters, their thresholds, and the percentage of time operated outside of the service thresholds can be detected by the overlay network controller 5 based on the processed telemetry data (TDATA) and notified to the parties of the service level Agreement (SLA). If the optical signals are operated beyond thresholds, the optical signals can be treated by the Network Domain Interface Devices 3 under control of the Overlay Network Controller 5 according to predefined policing rules. If the treatment of the respective optical signal i.e. the signal adjustment of the optical signal, is not successful (i.e. no achievement of compliance with SLA data), the affected optical signals can be shut down. A report can be created per demand or automatically at the end of a predefined time period e.g. at the end of each calendar month.

In a possible embodiment, the transparent optical overlay network 1 comprises for each transparent optical network domain 2-*i* associated network domain controllers 6-*i* as shown in FIG. 1. The domain controllers 6-1, 6-2 of the transparent optical network domains 2-1, 2-2 can supply, in a possible embodiment, service configuration parameters to the transparent optical overlay network controller 5. The transparent optical overlay network controller 5 as well as the network domain interface devices 3-*i* are under the responsibility of an overlay network operator. In contrast, the transparent optical network domains and associated network domain controllers 6-*i* are under the responsibility of a domain operator.

Figure 4:
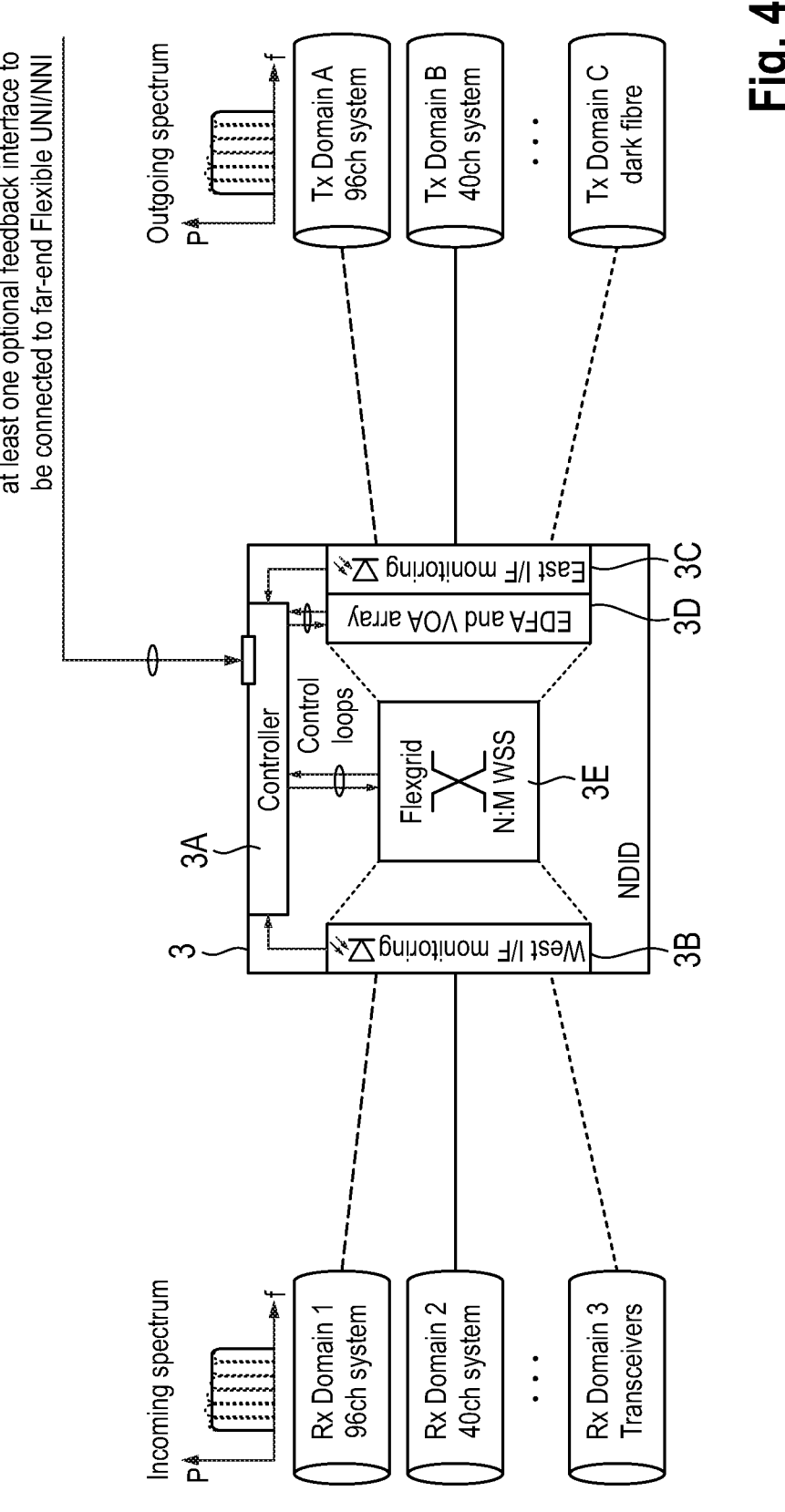
FIG. 4 shows a schematic diagram for illustrating a possible exemplary implementation of a network domain interface device according to an aspect of the present invention.
Figure 5:
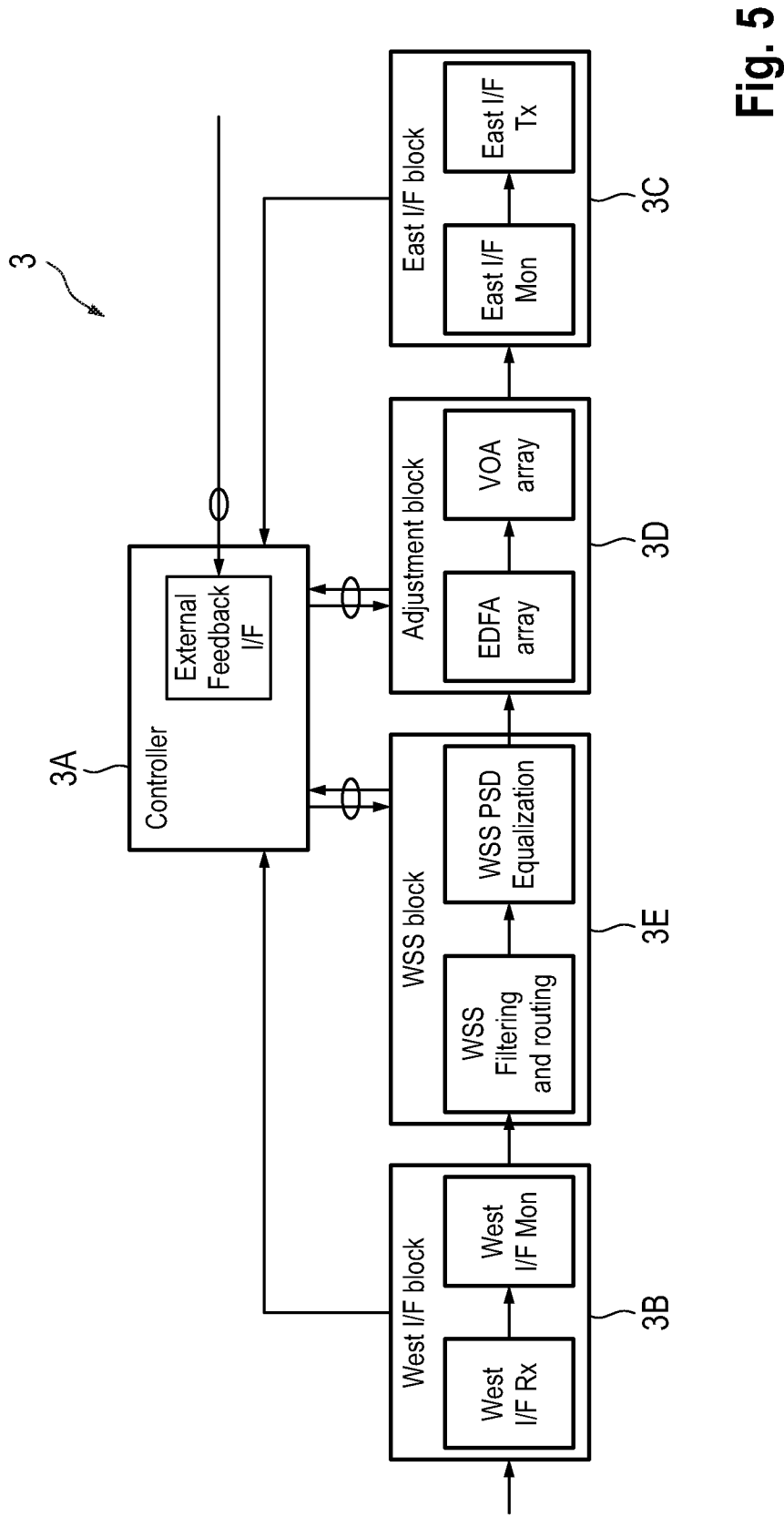
FIG. 5 shows a further schematic block diagram for illustrating a further possible exemplary embodiment of a network domain interface device according to an aspect of the present invention.

The network domain interface devices 3-*i* can comprise in a possible embodiment signal monitoring means. These signal monitoring means can comprise an input signal monitoring unit 3B and/or an output signal monitoring unit 3C as also shown in FIGS. 4, 5. The input signal monitoring unit 3B can be adapted to monitor incoming optical signals received by the network domain interface device 3 from a first transparent optical network domain 2-1 or from a transceiver 4 in an incoming optical signal spectrum. The output signal monitoring unit 3C is adapted in a possible embodiment to monitor outgoing optical signals transmitted by the network domain interface device 3 to a second transparent optical network domain 2-2 or to a transceiver 4 in an outgoing optical spectrum. The input signal monitoring unit 3B and the output signal monitoring unit 3C are adapted to generate monitoring data which can be supplied via an internal interface to a local controller 3A integrated in the respective network domain interface device 3-*i*. This local controller 3A integrated in the network domain interface device 3-*i* can be connected via a data interface to the transparent optical overlay network controller 5 of the transparent optical overlay network 1. In a possible embodiment, the gathered monitoring data can also be supplied by the local controller 3A as telemetry data TDATA via a data interface of the network domain interface device 3 to the common transparent optical overlay network controller 5. If access is granted, untreated telemetry data TDATA can be read out from the Controller 3A.

In a further possible embodiment of the transparent optical overlay network 1 as illustrated schematically in FIG. 1, each network domain interface device 3-*i* can comprise also signal adjustment means. These signal adjustment means can comprise in a possible embodiment at least one input signal adjustment unit 3E and at least one output signal adjustment unit 3D. The at least one input signal adjustment unit 3E is adapted to adjust incoming optical signals received by the network domain interface device 3-*i* from a first transparent optical network domain 2 or from a transceiver 4 in an incoming optical signal spectrum in response to control signals received by the at least one input signal adjustment unit 3E from the local controller 3A integrated in the respective network domain interface device 3-*i* or received from the overlay network controller 5. The at least one output signal adjustment unit 3D of the network domain interface device 3-*i* can be adapted to adjust outgoing optical signals transmitted by the network domain interface device 3-*i* to a second adjacent transparent optical network domain 2-2 or to a transceiver 4 in an outgoing optical signal spectrum in response to control signals received by the at least one output signal adjustment unit 3D from the local controller 3A integrated in the network domain interface device 3-*i* or received from the overlay network controller 5.

The input signal adjustment unit 3E of the network domain interface device 3-*i* is adapted in a possible implementation to shutdown, attenuate, amplify, filter, switch and/or to equalize the incoming optical signals received by the network domain interface device 3-*i* from a first transparent optical network domain 2-1 or from a transceiver 4 in the incoming optical signal spectrum in response to the control signals received by the input signal adjustment unit 3E from the controller 3A integrated in the respective network domain interface device 3-*i* and optical overlay controller 5. Further, the output signal adjustment unit 3D of the network domain interface device 3-*i* can be adapted to gradually enable, amplify, equalize and/or to pre-emphasize the outgoing optical signals transmitted by the network domain interface device 3-*i* to a second transparent optical network domain 2 or to a transceiver 4 in the outgoing optical signal spectrum in response to control signals received by the output signal adjustment unit 3D from the local controller 3A integrated in the network domain interface device 3-*i* and/or from the optical overlay controller 5. The output signal adjustment unit 3D of the network domain interface device 3-*i* can be further adapted to perform ASE noise insertion, dummy channel insertion and/or channel probing in response to the control signals received by the output signal adjustment unit 3D from the controller 3A integrated in the network domain interface device 3-*i* and/or from the optical overlay controller 5.

Besides the signal adjustment means, the network domain interface device 3-*i* comprises signal monitoring means. These signal monitoring means can be adapted to monitor different kinds of parameters including a signal power, a signal power spectral density, an OSNR, a GSNR or chromatic dispersion, or a PMD of the incoming optical signals and/or of the outgoing optical signals, when channel probing is used. In a possible embodiment, the signal monitoring means integrated in the network domain interface device 3-*i* can be adapted to monitor a performance of the incoming optical signal spectrum and/or in the outgoing optical signal spectrum of the adjacent optical network domains. The signal monitoring means integrated in the network domain interface device 3-*i* can in a possible implementation also be adapted to perform channel probing of optical channels in the incoming optical signal spectrum and/or in the outgoing optical signal spectrum of the adjacent optical network domains 2. The signal monitoring means can include the ability to provide corresponding telemetry data TDATA to the transparent optical overlay network controller 5 for the incoming and outcoming spectrum characterization and/or for long-term monitoring and service level agreement, SLA, policing. Each network domain interface device 3-*i* can comprise a control and data interface for connection to the overlay network controller 5 of the transparent optical overlay network 1 as shown in the schematic diagram of FIG. 1. The control and data interface can be provided to supply collected telemetry data TDATA to the transparent optical overlay network controller 5. The control and data interface may comprise a wired control and data interface but also in a possible implementation a wireless control and data interface to transport telemetry data TDATA.

In the illustrated embodiment of FIG. 1, the transparent optical network domains 2-1, 2-2 further comprise associated domain controllers 6-1, 6-2 connected to the overlay network controller 5 of the transparent optical overlay network 1 to supply information data about a network domain topology, resources and services of the associated transparent optical network domain 2 to the transparent optical overlay network controller 5. The overlay network controller 5 is adapted to manage and to control the end-to-end optical spectrum services by configuring the network domain interface devices 3-*i* provided at domain boundaries between adjacent transparent optical network domains 2-*i* or at domain boundaries between optical network domains and user transceivers 4-*i*. No changes are implemented in optical network domains 1 and 2 unless contractually agreed.

Figure 2:
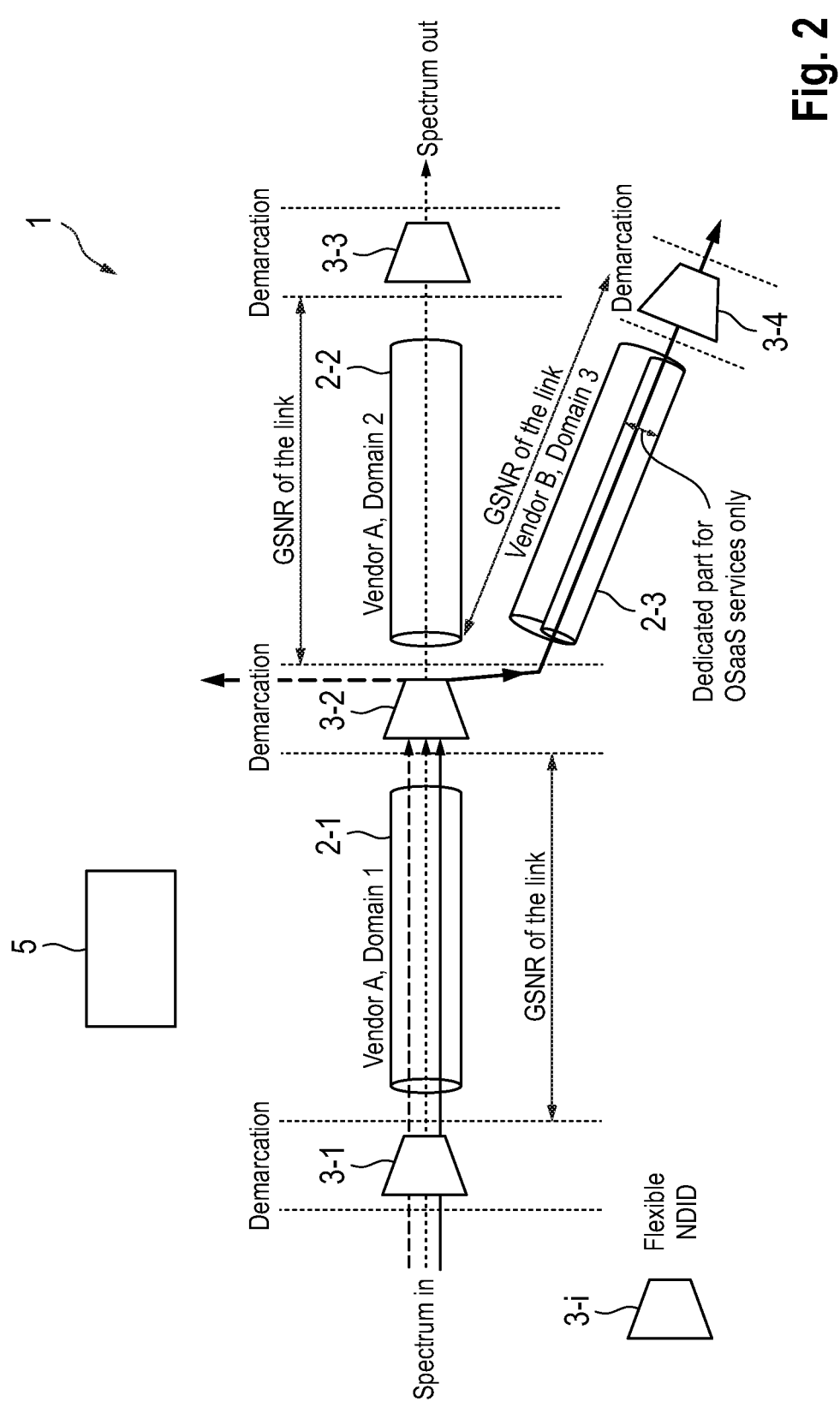
FIG. 2 shows a further schematic diagram for illustrating a further possible exemplary embodiment of a transparent optical overlay network according to the first aspect of the present invention.

FIG. 2 shows a further exemplary embodiment of a transparent optical overlay network 1. In the illustrated example, the transparent optical overlay network 1 comprises different transparent optical network domains 2-1, 2-2, 2-3. The transparent optical overlay network 1 comprises several network domain interface devices 3-*i* at the domain boundaries between adjacent transparent optical network domains 2-*i*. The transparent optical network domains 2-*i* can be vendor-specific. For instance, in the illustrated example of FIG. 2, the first transparent optical network domain 2-1 and the second transparent optical network domain 2-2 belongs to a vendor A whereas the third transparent optical network domain 2-3 belongs to a vendor B. In other embodiments, the transparent optical network domains 2-*i* can also belong to different operators or can comprise different regional domains. The transparent optical overlay network 1 can provide as transparent as possible connection between different ICT network domains. These can be logical (management) domains, vendor domains, regional domains, operator domains, client signal domains etc.

The transparent optical overlay network 1 is constructed on top of independent transparent optical network domains 2-*i* as underlay. The transparent optical overlay network 1 comprises a central overlay network controller 5 and further dedicated network domain interface devices 3-*i* at the transparent domain boundaries. This allows to combine and control optical spectrum resources and present them in federated form as optical virtual private network on layer 0 to a user. The flexible network domain interface devices 3-*i* can comprise means for spectral and signal conditioning and fast real time control. The network domain interface devices 3-*i* can also perform performance monitoring, fault isolation and also demarcation functions as also illustrated in FIG. 2. The overlay network controller 5 can provide management and control of end-to-end optical spectrum services by configuring the different network domain interface devices 3-*i* as network elements. The overlay network controller may also communicate with domain controllers 6-*i* as shown in FIG. 1 to exchange information about the network domain topology, resources and services in the transparent optical network domains available to the overlay network 1. The dedicated network domain interface devices 3-*i* can create a transparent tunnel between adjacent optical network domains 2-*i* by providing means for monitoring, an ASE noise/dummy channel, channel probe insertion, filtering, routing, power adjustment, gradual spectrum enabling and/or fast signal shutdown. The overlay network controller 5 of the transparent optical overlay network 1 can create an end-to-end network visibility and allows a construction of a transparent optical overlay network 1 defined by the network domain interface devices 3-*i* and the network path between them.

Figure 3:
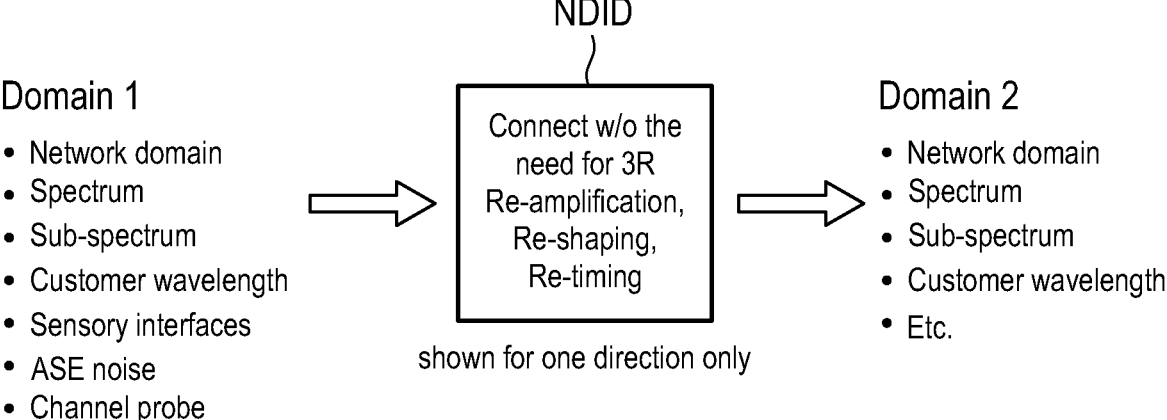
FIG. 3 illustrates schematically the functionality of a network domain interface device according to a further aspect of the present invention.

FIG. 3 shows schematically the different functions provided by a network domain interface device 3 which can be used in a transparent optical overlay network 1 according to the present invention. The network domain interface device 3 can be provided at a domain boundary between two adjacent transparent optical network domains 2 or at a domain boundary between at least one transceiver 4 and a transparent optical network domain 2. The network domain interface device 3 is adjusted to monitor and to adjust incoming optical signals received by the network domain interface device 3 from a first transparent optical network domain or from a transceiver and to monitor and to adjust outgoing optical signals output by the network domain interface device 3 to an adjacent second transparent optical network domain or output to a transceiver. The network domain interface device 3 can comprise a variety of different network functions, in particular with respect to the re-amplification and reshaping, as illustrated schematically in FIG. 3. The transparent optical overlay network 1 according to the present invention can comprise in a possible embodiment a plurality of flexible network domain interface devices 3 as illustrated in FIG. 3. These network domain interface devices 3 can be connected to a single central overlay network controller 5 as illustrated in FIGS. 1, 2. The transparent optical overlay network 1 can be independent of the underlying hardware and software used in the different transparent optical network domains 2. A basic set of inter-working functions IF can be provided that guarantee inter-working and signal integrity of the optical signals. The interworking functions allow safe interworking within the limits set by specific parameters including signal power and quality parameters or OSNR, etc. between different transparent optical network domains 2. Interworking can be performed to ensure that optical signals are transmitted only inside an assigned optical spectrum of an optical spectrum service. The provision of network domain interface devices 3-*i* allows ASE noise insertion as well as dummy channel insertion or amplifier control, balancing and saturation. The network domain interface devices 3-*i* can provide for a very fast shutdown of certain rogue signals detected by the signal monitoring means of a network domain interface device 3. Further, the network domain interface device 3 can provide for equalization, power levelling and limitation (potentially with amplification) of the outgoing optical signal spectrum as per a predefined threshold per domain, spectrum or optical spectrum service contract and SLA agreement.

The central overlay network controller 5 can decide in a possible embodiment how to treat different optical signals, optical network domains 2 or subdomains. The overlay network controller 5 can be adapted to manage and to control the end-to-end optical spectrum services by configuring the network domain interface devices 3-*i* provided at the domain boundaries via the control interfaces. The network domain interface devices 3-*i* can provide connection between different transparent optical network domains 2 which include domain-specific interworking function IF treatment. In this way, the independency of any of the participating network hardware can be assured. Unlike a conventional ROADM, the flexible dedicated network domain interface device 3-*i* can run independently of any of the interconnected transparent optical domains 2. However, the network domain interface device 3-*i* can be integrated into a transparent optical domain 2, if necessary. The network domain interface device 3-*i* can comprise its own independent monitoring means. This includes standard monitoring diodes but also non-standard probing techniques. The transparent optical overlay network 1 can provide an infrastructure overlay layer. This enables smart resource allocation and/or topology selection based on a minimum occupation/highest GSNR, highest availability and may provide also a feedback on a health situation and performance of the involved OLS network links.

FIG. 4 shows a possible exemplary embodiment of a network domain interface device 3 which can be used within a transparent optical overlay network 1 according to the present invention. The network domain interface device 3 can be provided at a domain boundary between two adjacent transparent optical network domains 2-1,2-2 of the transparent optical overlay network 1. In the illustrated embodiment, the network domain interface device 3 can comprise an integrated local controller 3A having at least one optical feedback interface for connection to another flexible network domain interface device 3. In the illustrated embodiment, the network domain interface device 3 comprises an input signal monitoring unit 3B and an output signal monitoring unit 3C. The input signal monitoring unit 3B can be adapted to monitor incoming optical signals received by the network domain interface device 3 from one or more transparent optical network domains 2-1 within an incoming optical spectrum as illustrated in FIG. 4. Further, the output signal monitoring unit 3C of the network domain interface device 3 can be adapted to monitor outgoing optical signals transmitted by the network domain interface device 3 to at least one second transparent optical network domain 2-2 in an outgoing optical spectrum as illustrated in FIG. 4. The input signal monitoring unit 3B as well as the output signal monitoring unit 3C are connected to the local controller 3A and supply monitoring data to the controller 3A integrated in the network domain interface device 3. The signal monitoring means 3B, 3C can supply monitoring data with respect to the incoming and the outgoing domain including channel probing. Besides the signal monitoring means 3B, 3C, the network domain interface device 3 comprises signal adjustment means. In the illustrated embodiment of FIG. 4, the signal adjustment means comprise an output signal adjustment unit 3D and an input signal adjustment unit 3E. The output signal adjustment unit 3D comprises in the illustrated implementation an EDFA array with optical signal amplifiers for signal amplification of optical signals in response to control signals received by the output signal adjustment unit 3D from the local controller 3A integrated in the network domain interface device 3 and/or overlay controller 5 and comprises a variable optical attenuator, VOA, array as shown in FIG. 4 to treat optical signals in response to control signals received by the output signal adjustment unit 3D from the local controller 3A integrated in the network domain interface device 3 and/or overlay controller 5.

In the illustrated embodiment of FIG. 4, the signal adjustment means of the network domain interface device 3 further comprises an input signal adjustment unit 3E including at least one N:M wavelength selective switch, WSS, where N≥1 and M≥2. The wavelength selective switch WSS controlled by the local controller 3A is adapted to switch or route the incoming optical signals received by the network domain interface device 3 within the incoming optical spectrum to the transparent optical network domains 2-1 to the outgoing optical spectrum in response to control signals received by the wavelength selective switch WSS of the input signal adjustment unit 3E from the local controller 3A integrated in the network domain interface device 3 as shown in FIG. 4. The input signal adjustment unit 3E can comprise means for adjusting, filtering, switching, ASE/dummy loading, channel probe insertion or equalization of the incoming optical signals.

FIG. 5 shows a further block diagram for illustrating a possible implementation of a network domain interface device 3. FIG. 5 shows the network domain interface device 3 illustrated in FIG. 4 as a block diagram.

The flexible network domain interface device 3 allows for a standalone independent inter domain signal adjustment between different optical network domains 2. The network domain interface device 3 provides in addition to signal monitoring an option to add ASE noise, dummy channels and to provide restrictive means like filtering, attenuation, signal blocking or gradual signal enabling, etc. Optical signals from the optical drop ports of the last ROADM of the optical network domain can be supplied to the network domain interface device 3 for signal policing and adjustments. The signals policed and treated by the network domain interface device, NDID, can be directly interconnected to optical add ports of the ROADMs of the adjacent optical network domain.

The transparent optical overlay network 1 does not require a modification of the underlying hardware nor of the software settings in the interconnected optical network domains 2. It only interconnects pre-allocated wavelengths or spectral chunks between optical network domains 2. The optical overlay network 1 can be operated independently from any physical or logical domain and can be used also to control and adjust the optical signals from dark fiber, passive CWDM filters or any passive or active system. The transparent optical overlay network 1 treats the optical spectrum services from the interconnected transparent optical domains, dedicated for infrastructure sharing, but has no other limitations based on reach, number of domains or used technology. The transparent optical overlay network 1 comprises an overlay network controller 5 which can act as a physical resource broker; however, the implementation of an inter-domain traffic engineering database is not mandatory. Each spectral slot can be engineered by an end customer or a user as desired. The flexible network domain interface device 3 allows to interconnect and create end-to-end connectivity between any end points as long as the physical incoming and outgoing signal parameter requirements can be met by the flexible network domain interface device 3.

The built-in signal monitoring means can include power and power spectral density based monitoring. In a possible implementation, built-in taps allow to implement additional external monitoring based on an optical spectrum analyzer, channel probing, etc. The monitoring means can be used for policing the incoming and outgoing light as per next domain requirements. Connectivity performance monitoring can be applied for a single optical network domain between the NDID devices or for end-to-end connectivity and is generally performed by the overlay network operator based on collected telemetry data from individual NDID controllers 3A and analysed by optical overlay controller 5. If no common overlay controller 5 is used, the connectivity performance can be controlled manually by individual optical network domain providers or customers, if they own or have access granted to NDID. According to the present invention, connectivity performance monitoring can be accomplished through analysing the monitoring data and telemetry data TDATA, ASE/dummy channel insertion, looping and channel probing options. In a possible embodiment, changes of signal conditions can be immediately registered by the flexible network domain interface device 3 through signal power or power spectral density monitoring. In addition to connectivity performance monitoring functions built into NDID, end customers can implement additional loopbacks and channel probing at the endpoints of the optical overlay network for additional fault localization like in any conventional use-case.

Further, service level agreements SLA between a user and a domain operator can be calculated as per parameter. It is possible to use time-based service level agreements SLA and their service level agreement SLA parameters for monitoring of a conformance of service parameters for each individual participating optical network domain or end-to-end optical spectrum services with the underlying service level agreement SLA parameters. The physical parameter-based interconnection allows for fast power adjustments as per individual signal carrier, optical spectrum services and/or per port. Rerouting is performed between pre-established physical routes to avoid violations to a GSNR, latency or other customer requirements. There are no scalability issues as the flexible network domain interface device 3 can be a local device and all available resources can be defined or described in a configuration memory of the network domain interface device 3.

Figure 6:
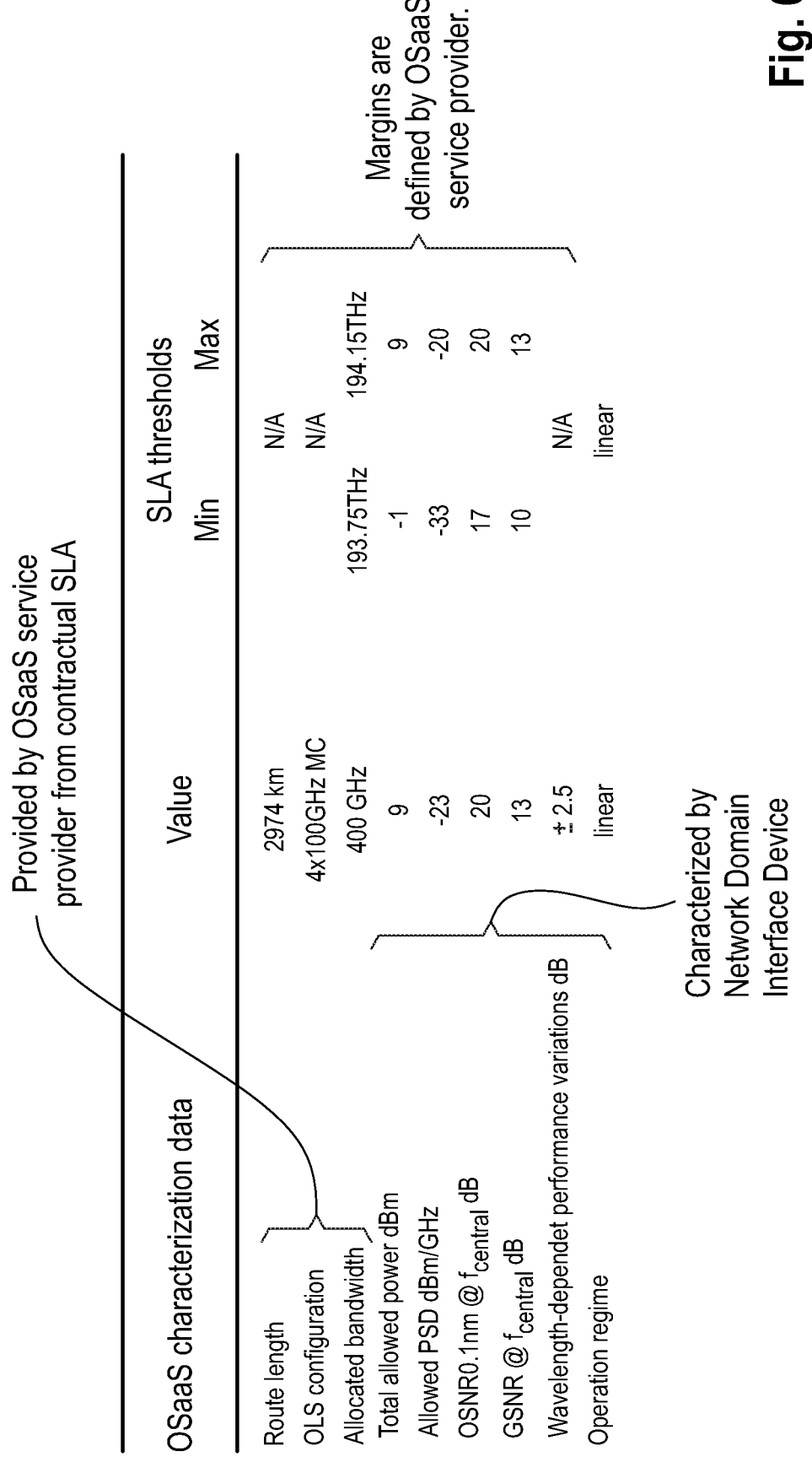
FIG. 6 illustrates an example of a service level agreement with included service characterization data from a network domain interface device (NDID)

FIG. 6 illustrates an example of a service level agreement (SLA), including information from the service characterization data of optical spectrum services. The service performance characterization is performed after the configuration. Optical spectrum service is a transparent light path connecting two endpoints in a single or multi-domain optical network, capable of carrying a single wavelength or multiple carriers over a predetermined spectrum. Optical spectrum service is completely independent from the underlying infrastructure and can hence be applied to both, flex-grid and legacy fixed grid systems, as long as the end-to-end optical spectrum is available for the service. Depending on the underlying infrastructure and components used in the open line system OLS implementation in the interconnected transparent optical domains, wavelength-dependent performance variations can become pronounced in long-haul service implementations. Service characterization allows these nuances to be described in SLA documentation.

A motivation for optical spectrum service characterization is to provide up-to-date information about the service performance without revealing business-sensitive data about the OLS system and its components. The optical spectrum service characterization data can include:

optical spectrum service boundary frequencies, allowed operation powers with thresholds, accurate performance values for achievable capacity estimations within the spectrum slot, precise capture of the possible wavelength-dependent performance variations within the provided optical spectrum service bandwidth, precise indication of the effective service bandwidth and filtering penalty at the service edges, presentation of possible nonlinear regimes within the provided optical spectrum service bandwidth.

Figure 7:
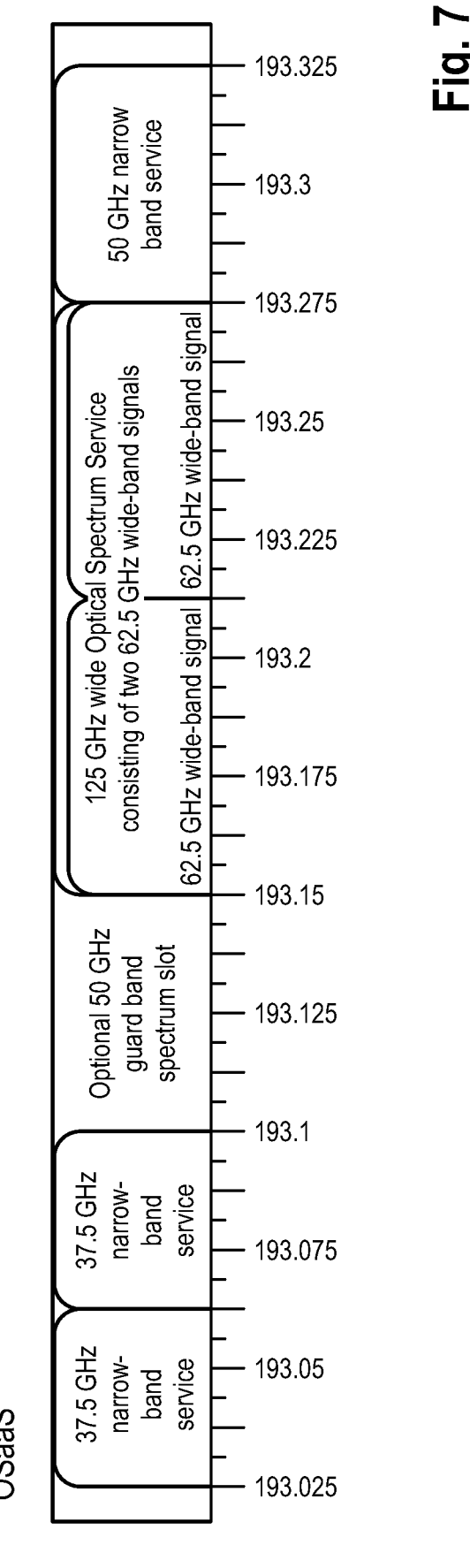
FIG. 7 illustrates Optical Spectrum Services with different service widths.

FIG. 7 illustrates the possible lay-out of the optical spectrum services in the OLS spectrum for narrow-band and wide-band optical spectrum services. The transparent optical overlay network 1 according to the present invention allows to characterize a service performance even when no OLS related data can be shared between parties. Furthermore, it is possible to monitor the compliance to a Service Level Agreement (SLA) between both parties, i.e. the spectrum provider and a spectrum user once the respective service is in an operational state.

Figure 8:
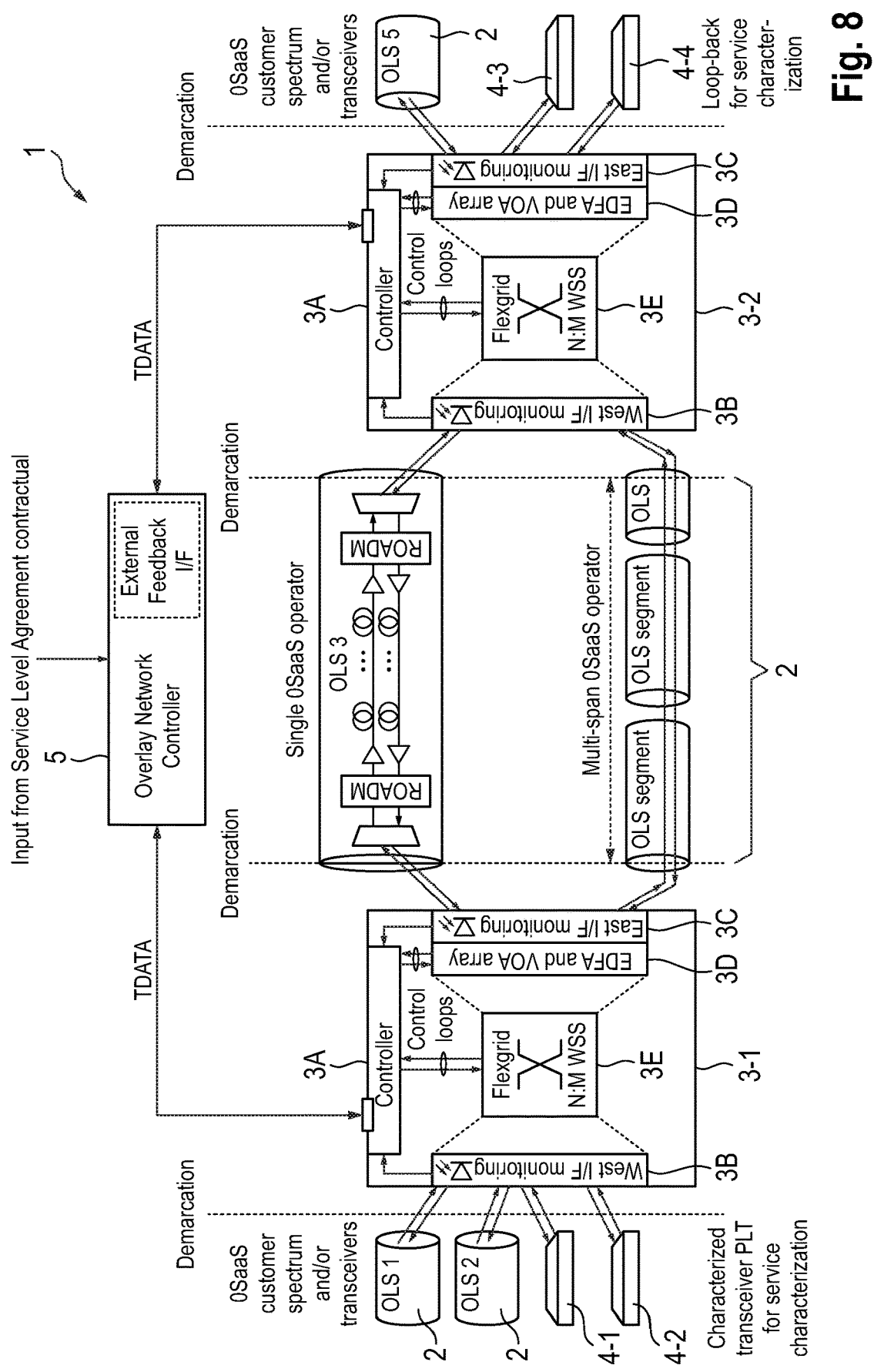
FIG. 8 shows a further schematic diagram for illustrating a further possible exemplary embodiment of a transparent optical overlay network according to the first aspect of the present invention.

FIG. 8 shows a further example of a transparent optical overlay network 1 according to an aspect of the present invention comprising an overlay network controller 5 having access to optical spectrum service's SLA and characterization data stored in a memory or database such as illustrated in FIG. 6 and receiving telemetry data TDATA from the network domain interface devices 3 to perform a compliance analysis during operation of the transparent optical overlay network 1. As can be seen in FIG. 8 the transparent optical network domains 2 can comprise a single span (i.e. OLS segment) operated by a single span optical spectrum service operator or multiple OLS-segments operated by a multi-span optical spectrum service operator.

A Servile Level Agreement (SLA) is a contractual agreement between end-customer and domain operator to define service parameters, their thresholds for secure operation, and the percentage of time the service shall be operated within the thresholds. The parameters from the optical spectrum service characterization data such as shown in the example of FIG. 6 can be adjusted by NDID for fulfilling contractual agreements. Further thresholds and degradation margins can be added to accommodate aging, channel fill, or unpredicted changes to the OLS performance.

REFERENCE LIST 1 transparent optical overlay network
2 transparent optical network domain
3 network domain interface device
4 transceiver
5 transparent optical overlay network controller
6 domain controller

What is claimed is:

1. A transparent optical overlay network for providing end-to-end optical spectrum services over multiple transparent optical network domains, said transparent optical overlay network comprising:

network domain interface devices, NDIDs, provided between domain boundaries of adjacent transparent optical network domains and not forming a part of the adjacent transparent optical network domains, wherein each of the NDIDs is adapted to monitor and adjust incoming optical signals received by the NDID from a first transparent optical network domain and to monitor and adjust outgoing optical signals output by the NDID to an adjacent second transparent optical network domain; and an overlay network controller adapted to manage and control the end-to-end optical spectrum services by controlling the NDIDs and adapted to collect telemetry data for optical spectrum service characterization of the optical spectrum services.

2. The transparent optical overlay network according to claim 1, wherein the overlay network controller is adapted to process telemetry data, in particular Q-values, Bit Error ratios, signal power level data, collected from the NDIDs to perform continuously a long term performance monitoring of the end-to-end optical spectrum services and/or participating transparent optical network domain parameters and their conformance with underlying service level agreement, SLA, parameters.

3. The transparent optical overlay network according to claim 1, wherein each of the NDIDs comprises signal monitoring means having an input signal monitoring unit adapted to monitor incoming optical signals received by the NDID from the first transparent optical network domain in an incoming optical signal spectrum and having an output signal monitoring unit adapted to monitor outgoing optical signals transmitted by the NDID to the second transparent optical network domain in an outgoing optical spectrum to generate monitoring data supplied by the input signal monitoring unit and supplied by the output signal monitoring unit to a controller integrated in the NDID.

4. The transparent optical overlay network according to claim 3, wherein the signal monitoring means of the NDID are adapted to monitor a signal power, a signal power spectral density, an OSNR, a GSNR, chromatic dispersion or PMD of incoming optical signals and/or of outgoing optical signals.

5. The transparent optical overlay network according to claim 4, wherein the signal monitoring means of the NDID are adapted to monitor the performance of the incoming optical signal spectrum and/or in the outgoing optical signal spectrum of the adjacent optical network domains and/or wherein the signal monitoring means of the NDID are adapted to perform channel probing of optical channels in the incoming optical signal spectrum and/or in the outgoing optical signal spectrum of the adjacent optical network domains.

6. The transparent optical overlay network according to claim 3, wherein the signal monitoring means include the ability to provide telemetry data for the transparent optical overlay network controller for incoming and outcoming spectrum characterization, long-term monitoring and Service Level Agreement, SLA policing.

7. The transparent optical overlay network according to claim 1, wherein each of the NDIDs comprises signal adjustment means having at least one input signal adjustment unit adapted to adjust incoming optical signals received by the NDID from the first transparent optical network domain in an incoming optical signal spectrum in response to control signals received by the at least one input signal adjustment unit from a controller integrated in the NDID and/or from the overlay network controller and having at least one output signal adjustment unit adapted to adjust outgoing optical signals transmitted by the NDID to the second adjacent transparent optical network domain in an outgoing optical signal spectrum in response to control signals received by the at least one output signal adjustment unit from the controller integrated in the NDID and/or from the overlay network controller.

8. The transparent optical overlay network according to claim 7, wherein the input signal adjustment unit of the NDID is adapted to shutdown, attenuate, amplify, filter, switch, and/or to equalize the incoming optical signals received by the NDID from the first transparent optical network domain in the incoming optical signal spectrum in response to control signals received by the input signal adjustment unit from the controller integrated in the NDID and/or from the overlay network controller.

9. The transparent optical overlay network according to claim 8, wherein the input signal adjustment unit of the NDID comprises at least one N:M wavelength selective switch, WSS, where N≥1 and M≥2, adapted to switch or route the incoming optical signals received by the NDID from the first transparent optical network domain to the second transparent optical network domain in response to control signals received by the input signal adjustment unit from the controller integrated in the NDID and/or from the overlay network controller.

10. The transparent optical overlay network according to claim 7, wherein the output signal adjustment unit of the NDID is adapted to gradually enable, amplify, equalize and/or to pre-emphasize the outgoing optical signals transmitted by the NDID to the second transparent optical network domain in the outgoing optical signal spectrum in response to control signals received by the output signal adjustment unit from the controller integrated in the NDID and/or from the overlay network controller.

11. The transparent optical overlay network according to claim 7, wherein the input signal adjustment unit and output signal adjustment unit of the NDID is further adapted to perform ASE noise insertion and/or dummy channel insertion in response to control signals received by the output signal adjustment unit from the controller integrated in the NDID and/or from the overlay network controller.

12. The transparent optical overlay network according to claim 7, wherein the output signal adjustment unit comprises an EDFA array with optical signal amplifiers for signal amplification of optical signals in response to control signals received by the output signal adjustment unit from the controller integrated in the NDID and a variable optical attenuator, VOA, array.

13. The transparent optical overlay network according to claim 1, wherein the NDID comprises a control and data interface for connection to the overlay network controller of the transparent optical overlay network.

14. The transparent optical overlay network according to claim 1, wherein the transparent optical network domains comprise associated domain controllers connected to the overlay network controller of the transparent optical overlay network to exchange information about a network domain topology, resources and services in the transparent optical network domains available to the transparent optical overlay network.

15. A network domain interface device, NDID, for a transparent optical overlay network used for providing end-to-end optical spectrum services over multiple transparent optical network domains, said transparent optical overlay network comprising:

the NDID being provided between domain boundaries of two adjacent transparent optical network domains and not forming a part of the adjacent transparent optical network domains, wherein the NDID is adapted to monitor and adjust incoming optical signals received by the NDID from a first transparent optical network domain and to monitor and adjust outgoing optical signals output by the NDID to an adjacent second transparent optical network domain, and an overlay network controller adapted to manage and control the end-to-end optical spectrum services by controlling the NDID and adapted to collect telemetry data for optical spectrum service characterization of the optical spectrum services, wherein the NDID provided between the domain boundaries of the two adjacent transparent optical network domains is adapted to monitor and to adjust incoming optical signals received by the NDID from a first transparent optical network domain, and to monitor and to adjust outgoing optical signals output by NDID to an adjacent second transparent optical network domain, wherein the NDID comprises an interface to the overlay network controller of the transparent optical overlay network provided to manage and control end-to-end optical spectrum services by controlling NDID.

16. An overlay network controller of a transparent optical overlay network used for providing end-to-end optical spectrum services over multiple transparent optical network domains, said transparent optical overlay network comprising:

network domain interface devices, NDIDs, provided between domain boundaries of adjacent transparent optical network domains and not forming a part of the adjacent transparent optical network domains, wherein each of the NDIDs is adapted to monitor and adjust incoming optical signals received by the NDID from a first transparent optical network domain and to monitor and adjust outgoing optical signals output by the NDID to an adjacent second transparent optical network domain, wherein the overlay network controller is adapted to manage and control the end-to-end optical spectrum services by controlling the NDIDs and is adapted to collect telemetry data for optical spectrum service characterization of the optical spectrum services.

\* \* \* \* \*